United States Patent [19]

Wightman

[11] 4,218,829

[45] Aug. 26, 1980

[54] FRAME-SETTING APPARATUS

[76] Inventor: William K. Wightman, 1034 Rimpau, Corona, Calif. 91720

[21] Appl. No.: 30,011

[22] Filed: Apr. 16, 1979

[51] Int. Cl.$^3$ .............................................. G01C 9/32
[52] U.S. Cl. ..................................... 33/348; 33/194
[58] Field of Search ..................... 33/295, 348, 194

[56] References Cited

U.S. PATENT DOCUMENTS

| | | | |
|---|---|---|---|
| 676,161 | 6/1901 | Sullivan | 33/295 |
| 2,579,644 | 12/1951 | Bergman | 33/295 |
| 3,589,014 | 6/1971 | Sarl | 33/295 X |

Primary Examiner—Charles E. Phillips
Attorney, Agent, or Firm—Francis X. LoJacono

[57] ABSTRACT

A frame-setting apparatus that is designed to be used in leveling frame structures having adjacent side-frame members that must be set in a close parallel relationship to their opposite sides, whether they be in a vertical or a horizontal position, wherein the apparatus comprises an elongated level having a plurality of spirit-level units spaced along the length of the level in the usual manner to provide a level reading in both a vertical and a horizontal position, and wherein flat elongated sections of mirrors are interposed between the spirit levels to reflect from one side frame member to the adjacent frame member, the mirrors being provided with a center-leveling line marked longitudinally along the length of each mirror, so as to aid in the alignment of a corresponding frame member when sighted in the mirrors.

2 Claims, 4 Drawing Figures

U.S. Patent     Aug. 26, 1980     4,218,829
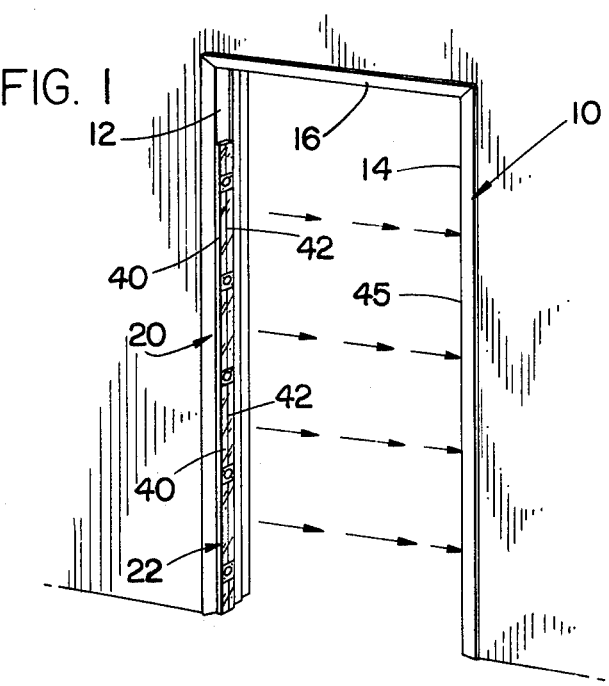
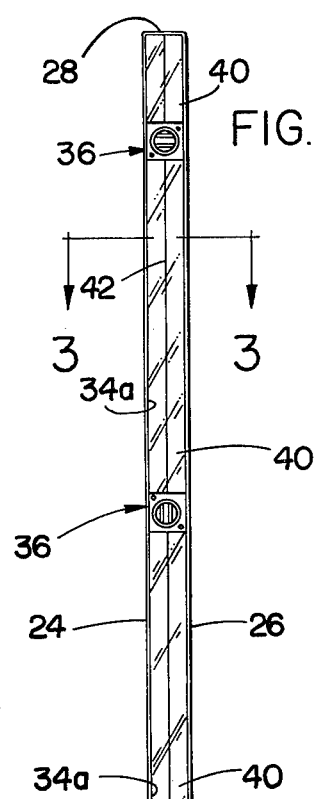
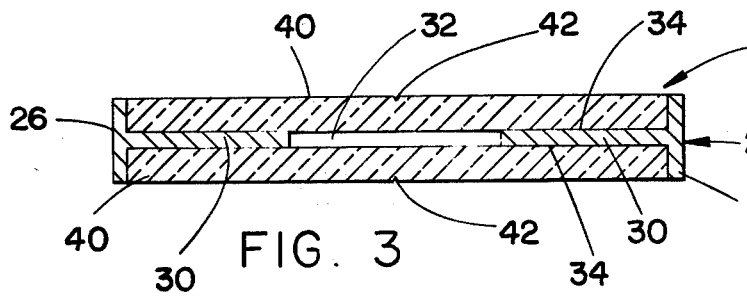
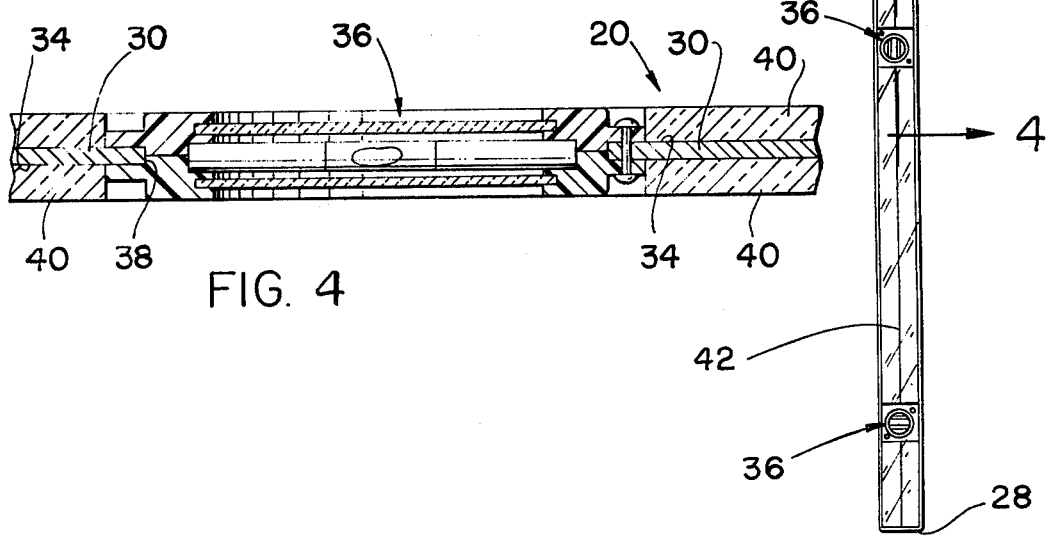

FRAME-SETTING APPARATUS

BACKGROUND OF THE INVENTION

1. Field of the Invention

This invention relates generally to a level device or tool, and more particularly to a level device that includes a plurality of mirror sections that include a level line marker disposed longitudinally thereon.

2. Description of the Prior Art

As is well known in the art, various problems and difficulties are encountered in providing suitable means for leveling and setting frame structures that require at least two opposing sides to be set in level parallel relation to each other.

Many types of level devices have been generated to solve the above problems. However, these devices have features that restrict their use, and are generally complicated and expensive.

One such device is disclosed in U.S. Pat. No. 2,636,282 wherein there is provided an elongated vertical standard having one vertical and horizontal spirit level. The standard includes an arm member extending at right angles to the standard. Thus, it can be seen that this device is limited in its use to the setting of door frames.

U.S. Pat. No. 3,064,535 is a level with a mirror that is used as a transit level and has limited areas of application.

The above device could not be used for such purposes as leveling and setting cabinet structures, whereby a back fixed framework must be leveled with the front framework to allow for the positioning of a flat top member thereacross, as well as providing an overall level cabinet to allow the cabinet doors to open and close in a proper manner.

Thus, it will be understood that the apparatus as herein disclosed will be useful in a variety of applications heretofore not possible with known devices.

SUMMARY AND OBJECTS OF THE INVENTION

The present invention has for an important object a provision whereby one individual can level and set a frame structure having two opposed frame members that must be level and parallel to each other, wherein the apparatus comprises an elongated level member having a plurality of spirit-level members spaced longitudinally along the central axis thereof in a usual manner. The spaces defined between each spirit-level member are provided with a section of mirror plate which includes a centrally disposed sighting line, whereby the sighting line of each mirror plate is longitudinally aligned so as to extend from one end of the level to the other.

Another object of the invention is to provide a level apparatus that is not limited to the alignment of door frames, but can be used in many areas of construction, such as the installation of large windows, cabinets, etc.

It is another object of the invention to provide an apparatus of this type that can be used by unskilled as well as skilled individuals.

It is still another object of the present invention to provide an apparatus of this character that has no moving parts, and that is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only, and wherein like numerals are used to designate like parts throughout the same:

FIG. 1 is a pictorial view of a door frame structure showing the present invention as it would normally be positioned for sighting and leveling of the opposite vertical frame member;

FIG. 2 is a front-elevational view of the level apparatus;

FIG. 3 is an enlarged cross-sectional view taken along line 3—3 of FIG. 2; and

FIG. 4 is an enlarged cross-sectional view taken substantially along line 4—4 of FIG. 2, showing the arrangement of one of the spirit levels and the adjacent mirrors.

DESCRIPTION OF THE PREFERRED EMBODIMENT

Referring more particularly to FIG. 1, there is shown a typical door frame structure, generally indicated at 10, having oppositely disposed vertical jamb members 12 and 14, respectively, and a connecting horizontal head jamb 16. It should be noted that door frame structures are constructed of wood members or metal members, and the present apparatus is applicable to both types of construction material. However, it is well known that the alignment of metal door frames is much more critical—due to the fact that, once they are set, it is very time-consuming and expensive to realign them. In addition, metal frames are used in the construction of large buildings, wherein the doors are mounted during one of the last construction phases. Thus, to assure the proper hanging and fitting of each door, such related door jambs must be aligned as parallel and as vertical to each other as possible.

It should be noted that at the present time door jambs are individually set—that is, first one jamb side is leveled and then the opposite jamb side is leveled. When set in the normal manner, each side jamb can be set. When set in normal manner, each side jamb can be as much as one-eighth of an inch off, jaking a total of a quarter of an inch for both. However, when the present apparatus is used, each jamb is set evenly with respect to the other.

Accordingly, the frame-setting level, indicated generally at 20, is shown in FIG. 1 as being positioned against side jamb 12. The method of aligning side jambs 12 and 14 will hereinafter be described in detail.

Frame-setting level 20 comprises an elongated frame member 22 having an extended length to fit within the door opening. Frame member 22 is formed having annular side-flange members 24 and 26, and cap-end flanges 28—whereby all of the flange members are interconnected by an intermediate web member 30, as is typical in most level devices, wherein the central portions are slotted as at 32 so as to provide a lightweight structure. Thus, as seen in the cross-sectional view of FIG. 3, flanges 24 and 26 together with web 30 define a pair of oppositely disposed elongated cavities 34. Equally spaced and mounted within cavities 34 are spirit levels, designated at 36. Spirit levels 36 can be any known suitable type and are herein shown in FIG. 4 as being mounted to web 30, wherein web 30 is provided with an annular aperture 38 to receive the spirit level therein.

Thus, as seen in FIG. 4, the spirit levels are positioned in spaced relationship to each other, thereby defining a plurality of cavity sections 34a in which are respectively mounted a matching plurality of reflective means, shown as mirrors 40. It should be understood that various reflective means can be employed therein. However, elongated rectangular mirror sections 40 are preferred, these being glued or bonded within each respective cavity section 34a—thereby providing a clear reflective surface. Further included as part of each mirror section 40 is a longitidunal reference line 42, line 42 being etched or imprinted within the glass member thereof, so as to extend the full length of the level. It is contemplated that reference line 42 can be formed in several different ways—another being locating the line on the inner surface of the glass member prior to having the glass member silvered.

Referring again to FIG. 1, the level 20 is placed on one side jamb, such as 12, whereby jamb 12 is vertically aligned in the well-known manner and set into a fixed position. Once this is accomplished, level 20 is positioned vertically against the set side jamb 12—at which time one looks into the plurality of mirror sections 40 to see the opposite side jamb 14 reflected therein. At this time, any vertical leading edge (such as 45) of the second side jamb 14 is sighted with respect to the vertical reference line 42. Side jamb 14 is then adjusted, whereby leading edge 45 is vertical with and parallel to reference line 42, the leading edge 45 thus overlying and matching the vertically positioned reference line which represents the established, vertically fixed side jamb 12. Side jamb 14 is, at this time, set in place and aligned in an identical parallel plane with respect to the opposite side jamb 12.

The above description of the present invention is just one of the many ways of solving leveling problems. As a further example of the device's additional use (not shown herein) is that of providing a simple means to level wall and floor cabinets. For example, when a floor cabinet is to be installed, the rear structure of the cabinet is usually secured to a wall and the front leading edge of the cabinet is then leveled. With the present apparatus, the rear of the cabinet is mounted to the wall in a leveled condition—after which level 20 is horizontally positioned along the leveled rear of the cabinet, and the front leading edge is sighted with respect to the horizontal leveled reference line 42.

Thus, from the above description, it can be readily understood that other applications of the present invention could be employed by skilled workmen.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A level apparatus for setting frame structures having opposite frame members that must be leveled and positioned in parallel relation to each other, either vertically or horizontally, wherein the apparatus comprises:

a level defined by an elongated frame member;

a plurality of spirit-level units mounted longitudinally along said level frame member in spaced relation to each other, wherein at least one of said units is positioned longitudinally from said frame, and at least one unit is positioned transversely from said frame whereby said level is adapted to be used vertically or horizontally;

a space section defined between each of said spirit level units;

a plurality of reflective members defined by mirror sections disposed within said space sections;

a reference line centrally disposed and longitudinally positioned along the full length of each reflective member to provide a reference alignment line for the corresponding reflective frame member when sighted in said mirrors.

2. A level apparatus as recited in claim 1, wherein said level frame member comprises:

a pair of annular side-frame members;

a pair of flange-end cap members connected to said side flanges;

an intermediate web member interconnecting all of said annular flange members, defining a pair of oppositely disposed elongated cavities wherein said spirit-level units are positioned; and wherein said flanges and said spirit-level units together define a plurality of cavity sections to receive said reflective members within said space sections.

* * * * *